A. W. and J. CAMPBELL.
Walking Planter.
No. 251.
A I Patented October 4, 1859.
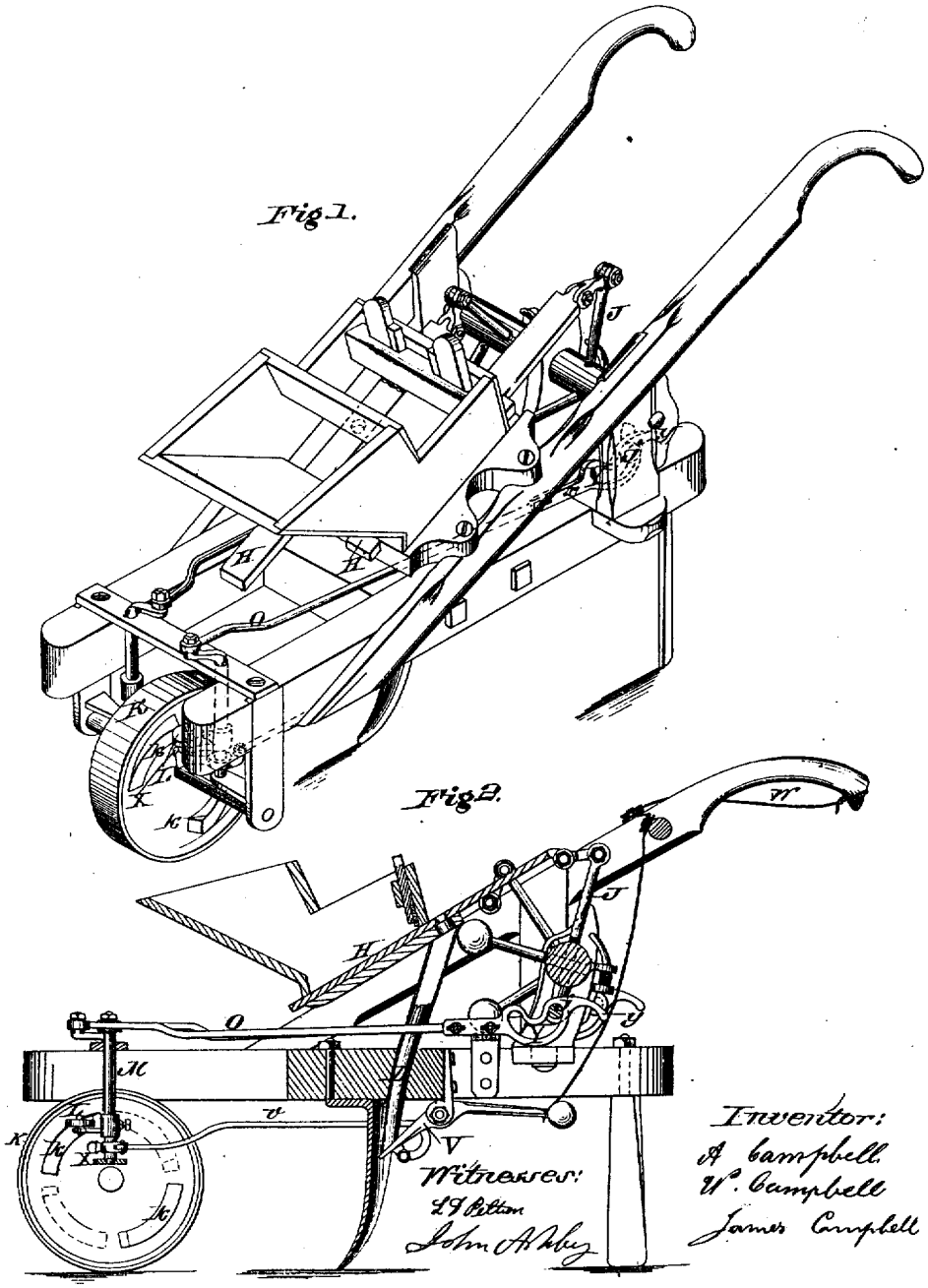
N. PETERS, PHOTO-LITHOGRAPHER, WASHINGTON, D. C.

UNITED STATES PATENT OFFICE.

ALEX. CAMPBELL, WM. CAMPBELL, AND JAMES CAMPBELL, OF HARRISON, OHIO.

IMPROVEMENT IN CORN-PLANTERS.

Specification forming part of Letters Patent No. 24,537, dated June 28, 1859; Additional Improvement No. 251, dated October 4, 1859.

*To all whom it may concern:*

Be it known that we, ALEXANDER CAMPBELL, WILLIAM CAMPBELL, and JAMES CAMPBELL, all of Harrison, Hamilton county, Ohio, have made new and useful Improvements on our Improvement in Corn-Planters patented 28th day of June, 1859; and we do hereby declare the following to be a full, clear, and exact description thereof, reference being had to the annexed drawings, making part of this specification.

Our present improvements relate to, first, an arrangement for depositing the grain with greater precision and certainty; second, a provision whereby the seed-dropping mechanism is ungeared automatically by a retrograde movement of the machine.

In the accompanying drawings, Figure 1 is a perspective view, and Fig. 2 a longitudinal section.

The discharging end of the tube D is formed obliquely, and is guarded by a weighted valve, V, capable of being manipulated by a cord, W, or operated automatically by a tappet, X, on the wheel K, which at each revolution strikes a rod, *v*, attached to the valve V. The number of cams *k* relatively to the tappets X determines the frequency of movement of the slides H and valve V, respectively; but it is intended that the former should be always at least twice as frequent as the latter, so as to give at least two chances for the deposition of seed into the tube D at every valve movement.

To enable the automatic discontinuance of the seed-dropping action, we connect the rod *o* with the rocking lever J by means of a wrist, *j*, on the lever occupying a slot (having the form of an inverted arch) in the rod O, and called the "yoke Y." When the wrist *j* occupies the part of the yoke Y indicated in the drawings the seed-dropping mechanism is in full connection with its operating cam-wheel K *k;* but let the machine be drawn backward, so as to cause a retrograde motion of the cam-wheel, and immediately the rear ends of the cams *k* strike back forcibly against the rollers L, so as to reverse the action of the crank-shaft M and to push back the rod *o* until the wrist *j* lodges in the front end of the yoke Y. The handle *y* enables the yoke Y to be placed in either the active or inactive position by hand. In the latter position of the yoke Y the planter can be removed freely about without disturbing the dropping mechanism.

We claim herein as new and of our invention and desire to secure by Letters Patent—

1. The described arrangement of the weighted valve V, rod *v*, tappet X, wheel K *k*, slides H, and tube D, for the purpose set forth.

2. In the described combination with a cam-wheel, K *k*, crank-shaft M, rod O, and rocking lever J *j*, the inverted arch-yoke Y *y*, constructed and operating as set forth.

In testimony of which invention we hereunto set our hands.

A. CAMPBELL.
W. CAMPBELL.
JAMES CAMPBELL.

Witnesses:
JOHN ASHBY,
L. D. PELTON.